United States Patent [19]

Muller

[11] Patent Number: 5,372,830
[45] Date of Patent: Dec. 13, 1994

[54] METHOD OF PREPARING EGG COATED POTATO SLICES

[76] Inventor: Candace L. Muller, 2201 Stratford, Mission Hills, Kans. 66208

[21] Appl. No.: 203,228

[22] Filed: Feb. 28, 1994

[51] Int. Cl.$^5$ ............................................. A23L 1/216
[52] U.S. Cl. ..................................... 426/302; 426/637
[58] Field of Search ............... 426/102, 302, 637, 510, 426/511, 523

[56] References Cited

U.S. PATENT DOCUMENTS

| | | | |
|---|---|---|---|
| 3,754,931 | 8/1973 | Waitman et al. | 426/102 |
| 4,084,008 | 4/1978 | Yueh et al. | 426/510 X |
| 4,283,425 | 8/1981 | Yuan et al. | 426/637 X |
| 4,906,483 | 3/1990 | Kloos | 426/637 X |
| 4,919,965 | 4/1990 | Childers | 426/523 X |
| 5,194,277 | 3/1993 | Laufer | 426/637 X |

*Primary Examiner*—Arthur L. Corbin
*Attorney, Agent, or Firm*—Hovey, Williams, Timmons & Collins

[57] ABSTRACT

A method of preparing a potato product which is moist on the inside and crispy on the outside including the steps of slicing raw potatoes into thin potato slices, steaming the potato slices until fully cooked, cooling the steamed potato slices, coating the steamed potato slices with an egg mixture after cooling, freezing the coated potato slices, and baking the frozen coated potato slices in a conventional oven until a desired browning color and crispness is achieved. The combined steps of steaming the potato slices, coating the steamed slices and freezing before final baking produce a potato product that is moist on the inside and crispy on the outside.

8 Claims, 2 Drawing Sheets

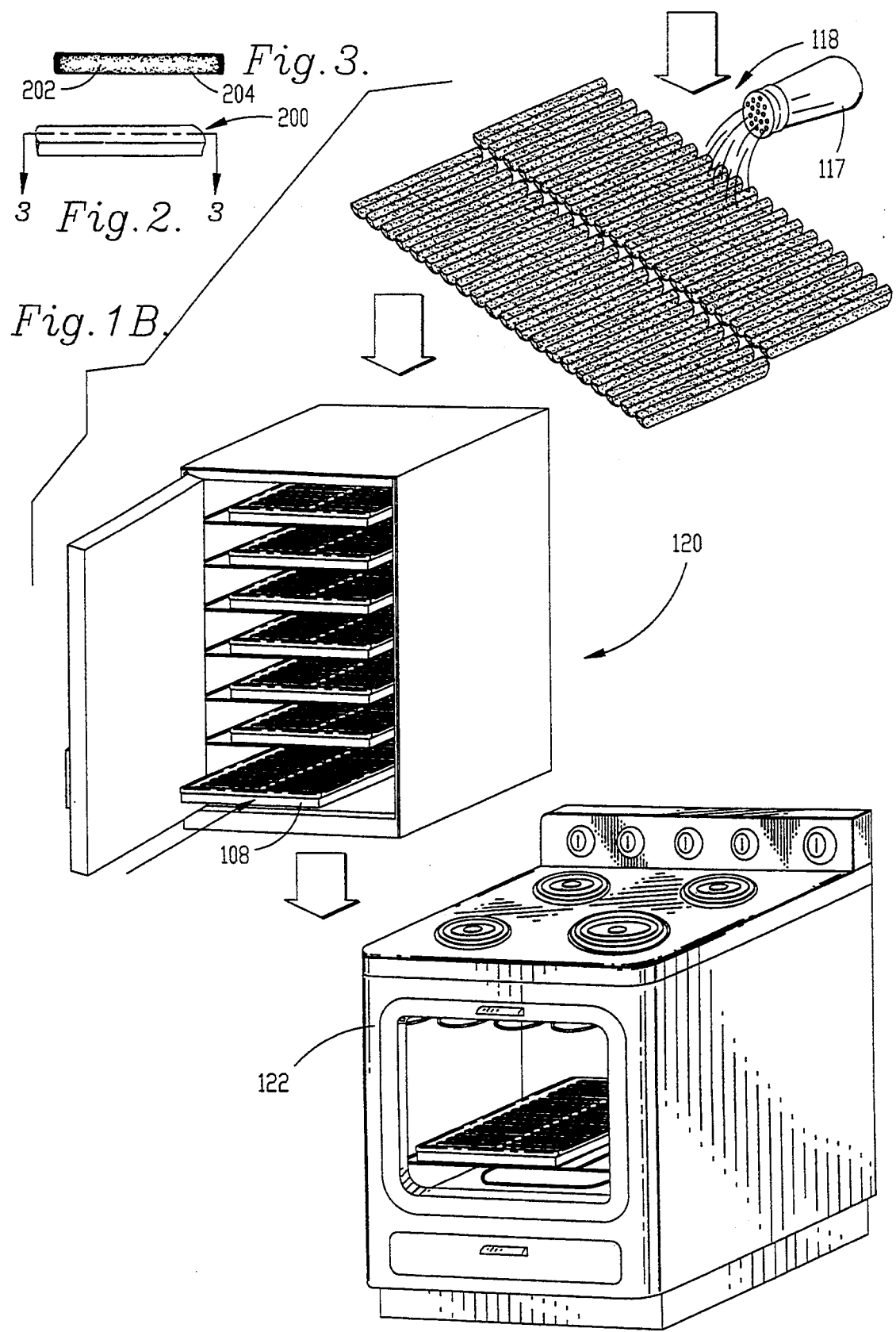

METHOD OF PREPARING EGG COATED POTATO SLICES

BACKGROUND OF THE INVENTION

1. Field of the Invention

The present invention is concerned with a method for preparing potato products. More particularly, the present invention relates to a method of preparation of fat-free potato products such as french fries including the steps of steaming, coating, freezing and baking to achieve a cooked potato product that is moist on the inside and crispy on the outside.

2. Description of the Prior Art

Potato products such as potato chips and french fries are immensely popular as snack foods. However, potato snacks are conventionally prepared with deep fat frying means which results in a snack with extremely high fat, oil and calorie content. The resulting high fat content product is undesirable for persons who are concerned with their weight and health. In recent years, snack manufacturers and cooks have become increasingly aware of these dietary concerns and have responded by introducing fat-free snacks and methods of preparing fat-free potato snacks.

Fat-free potato snacks are prepared by a variety of cooking methods including microwaving and conventional radiant oven cooking. For example, U.S. Pat. No. 4,906,483 discloses a fat-free cooking process for potatoes including the steps of microwave cooking followed by conventional radiant oven cooking. Similarly, U.S. Pat. No. 4,283,425 discloses a low fat potato product prepared using a process involving a microwave oven and a protein coating. Other known efforts in the field of fat-free potato product preparation include U.S. Pat. Nos. 3,904,429 and 4,098,906, both of which disclose microwave cooking.

The prior art fat-free cooking methods for potatoes discussed above all employ microwave or radiant oven cooking. Although microwave cooking results in a low fat or fat-free potato product, it creates a finished snack which has poor texture due to uneven cooking. Additionally, microwave cooking tends to dehydrate the cut potato, resulting in a tough and stringy snack. Radiant oven cooking potato slices before and after freezing also results in a low fat product, but the two baking steps dehydrate the potato slices and form a tough coating on the finished product.

Since many consumers find snacks prepared by these prior art methods undesirable, the snacks are not suitable substitutes for deep fat fried snacks. Thus, the prior art points out the need for a method of preparing potato snacks which results in a snack which is both low fat or fat-free and of a desirable texture and moisture content.

SUMMARY OF THE INVENTION

The present invention overcomes the problems outlined above and provides an improved method of preparing fat-free potato snacks. More particularly, the present invention provides a method of preparation of fat-free potato products resulting in a cooked potato product that is moist on the inside and crispy on the outside.

The preferred method of preparation includes the steps of slicing raw potatoes into thin potato slices and then soaking the potato slices in cold water to prevent oxidation of the potato slices prior to preparation. When the potato slices are ready for preparation, they are placed on a perforated tray in a single layer and steamed in a conventional steamer until fully cooked. Unlike microwave and radiant oven cooking, the steaming step fully cooks the potato slices while locking in their moisture and natural flavors.

After steaming, the potato slices are cooled and coated with an egg white mixture. Once coated, the slices are placed in a freezer until fully frozen. The coated fries can be packaged or covered in the freezer until ready for serving. Finally, before serving, the coated fries are cooked in a conventional radiant heat oven until a desired browning color and crispness is achieved. The preferred method of preparation produces a fat-free potato product that is moist on the inside and crispy on the outside.

BRIEF DESCRIPTION OF THE DRAWINGS

FIG. 1B is a continuation of the flow representation of FIG. 1A illustrating the steps in producing a fat-free potato product;

FIG. 2 is a representation of a fully prepared fat-free potato product prepared using the method of the present invention; and FIG. 3 is a cross section view of a fully prepared fat-free potato product taken along line 3—3 of FIG. 2.

DETAILED DESCRIPTION OF THE PREFERRED EMBODIMENTS

Figure 1A:
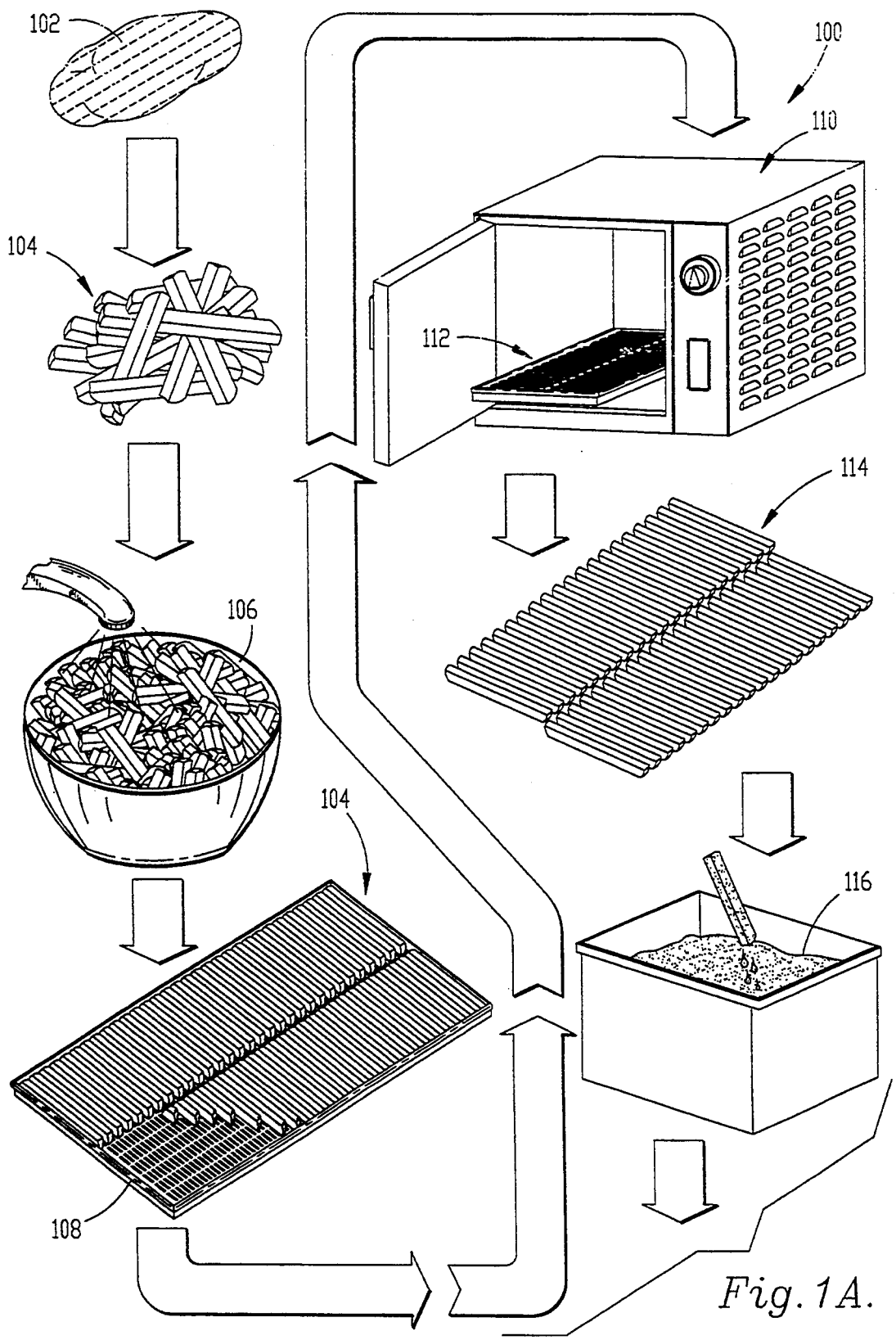
FIG. 1A is a flow representation of the present invention illustrating the steps in producing a fat-free potato product.

Turning now to the drawings, and particularly FIGS. 1A and 1B, the method steps of the present invention are shown in a flow representation. The invention includes a method of preparing fat-free french fries 100 wherein a raw potato 102 is first sliced into french fries 104 by any conventional cutting apparatus. Potato 102 may be peeled or unpeeled, depending on the taste of the consumer. In preferred forms, the raw potato is cut into slices approximately 3 inches long having a cross section measurement of $\frac{1}{2}$-$\frac{3}{4}$ inch by $\frac{1}{2}$-$\frac{3}{4}$ inch. This size range is optimal for creating a finished potato product of desirable texture.

Once raw potato 102 is cut, the slices 104 are placed in a bowl 106 or pan and rinsed in cold water to remove surface potato starch. To prevent oxidation, the potato slices must remain submerged in the bowl 106 of cold water until ready for further preparation. If desired, the bowl of submerged potato slices may be refrigerated until further preparation is desired.

After the rinsing and submerging steps, the potato slices 104 are arranged on a perforated tray 108 in a single layer and placed in a conventional steamer 110 for steaming. The preferred embodiment of the present invention utilizes a multiple-tray commercial steamer such as Model HY-3E manufactured by Groen, however any conventional steamer may be used. More than one tray 108 of potato slices 104 may be steamed simultaneously if a larger batch of snacks is desired. The potato slices are steamed for approximately 10 minutes or until fully cooked. Unlike microwave and radiant oven cooking, the steaming step fully cooks the potato slices while locking in their moisture and natural flavors. With this method, the final potato product is moist on the inside and crispy on the outside after final cooking.

As illustrated in step 114, the tray of steamed potato slices 112 are removed from steamer 110 after steaming, and the individual slices are removed from tray 108 and placed in a single layer to cool at room temperature for at least 10 minutes. It is important to fully cool the steamed potato slices before proceeding to the next step in method 100.

After cooling, the potato slices are dipped in an egg white mixture 116. The preferred egg white mixture contains egg whites, water, salt, sugar, garlic powder, and black pepper. The egg white mixture 116 coats the potato slices to seal in moisture and to add flavor to the finished product. The coated slices are then sprinkled with salt 117 or other desired seasonings as illustrated in step 118. As those skilled in the art of cooking will appreciate, a variety of mixtures may be used to coat the french fries instead of the preferred egg white mixture.

In the next step of method 100, the cooled, coated potato slices are placed on one or more perforated trays 108 in a single layer and frozen in a conventional freezer 120. The coated slices must be thoroughly frozen before proceeding to the next step. Although the time required to achieve complete freezing varies, approximately 12 hours is usually sufficient. In order to prevent the slices from sticking to each other during the freezing step, it is best to space the slices on the trays. After the slices are fully frozen, they can be packaged to be sold as frozen, ready-to-heat fries or stored on the trays for subsequent heating.

Finally, the frozen potato slices are arranged on perforated tray 108 or other cooking tray and placed in a conventional radiant heat oven 122 for final heating and browning. Since the frozen potato slices are fully cooked in the steaming step, they may be warmed at any desirable temperature for any amount of time to achieve the desired browning level. In the preferred embodiment, the final baking step occurs in an oven at a temperature of 400° degrees for approximately 20-30 minutes. The fries should be turned once during the final heating period to ensure even browning.

As illustrated in FIGS. 2 and 3, the above-described method of preparing french fries 100 results in a fat free potato snack 200 which has a moist center 202 and a crispy outer layer 204. Unlike microwave and radiant oven cooking, the steaming step of the present invention fully cooks the potato slices while locking in their moisture and natural flavors. With this method, the cooked potato product is moist on the inside and crispy on the outside.

As those skilled in the art will appreciate, the present invention is not limited to the preferred method described above but encompasses numerous variations.

Having thus described the preferred embodiments of the present invention, the following is claimed as new and desired to be secured by Letters Patent:

1. A method of preparing a potato product comprising the steps of:
   slicing raw potatoes into thin potato slices;
   steaming the potato slices until said slices are fully cooked;
   cooling the steamed potato slices;
   coating the cooled potato slices with an egg mixture;
   freezing the egg mixture coated potato slices; and
   baking the frozen coated potato slices in a conventional oven until a desired brown color and crispness is achieved to produce a potato product that is moist on the inside and crispy on the outside.

2. A method of preparing a potato product as recited in claim 1, further including the step of slicing said raw potato into slices approximately 3 inches long having a cross section measurement of ½ inch by ½ inch.

3. A method of preparing a potato product as recited in claim 1, further including the step of soaking said potato slices in a cold liquid after slicing to prevent oxidation of said potato slices.

4. A method of preparing a potato product as recited in claim 1, said steaming step further including the steps of placing said potato slices on a perforated tray in a single layer, and steaming said tray of potato slices in a conventional steamer until fully cooked to lock in the moisture of said potato slices so that said potato product is moist on the inside and crispy on the outside after final cooking.

5. A method of preparing a potato product as recited in claim 4, wherein said steaming step occurs for approximately 10 minutes.

6. A method of preparing a potato product as recited in claim 1, wherein said freezing step occurs for at least 12 hours.

7. A method of preparing a potato product as recited in claim 1, wherein said baking step occurs in an oven at a temperature of 400 degrees for approximately 20-30 minutes.

8. A method of preparing a potato product comprising the steps of:
   slicing raw potatoes into thin potato slices;
   soaking said potato slices in a cold liquid to prevent oxidation of said potato slices;
   placing said potato slices on a perforated tray in a single layer;
   steaming said tray of potato slices in a steamer until said slices are fully cooked;
   cooling said tray of potato slices after steaming;
   coating said potato slices with an egg mixture after cooling;
   freezing the egg mixture coated potato slices until fully frozen; and
   baking the frozen coated potato slices in an oven until a desired brown color and crispness is achieved to produce a potato product that is moist on the inside and crispy on the outside.

* * * * *